US012691908B2

(12) United States Patent
Gall et al.

(10) Patent No.: US 12,691,908 B2
(45) Date of Patent: Jul. 28, 2026

(54) DETERMINATION OF AN ACTION FOR AN AUTONOMOUS VEHICLE IN THE PRESENCE OF INTELLIGENT AGENTS

(71) Applicant: Motional AD LLC, Boston, MA (US)

(72) Inventors: Kevin C. Gall, Dover, NH (US); Alexander Brown, Dover, NH (US); Bence Cserna, East Boston, MA (US)

(73) Assignee: Motional AD LLC, Boston, MA (US)

(*) Notice: Subject to any disclaimer, the term of this patent is extended or adjusted under 35 U.S.C. 154(b) by 500 days.

(21) Appl. No.: 17/887,535

(22) Filed: Aug. 15, 2022

(65) Prior Publication Data

US 2024/0051581 A1 Feb. 15, 2024

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 2420/403* (2013.01); *B60W 2420/408* (2024.01); *B60W 2420/54* (2013.01); *B60W 2554/4045* (2020.02)

(58) Field of Classification Search
CPC ......... B60W 60/0027; B60W 50/0097; B60W 2554/4045; B60W 2420/408; B60W 2420/403; B60W 2420/54
USPC ........................................................ 701/26
See application file for complete search history.

(56) References Cited

U.S. PATENT DOCUMENTS 11,126,873 B2 9/2021 Lee et al.
2020/0114813 A1* 4/2020 Lujan .................. B60Q 1/0035
2021/0053570 A1 2/2021 Akella et al.
2021/0129834 A1* 5/2021 Gier .................. B60W 30/0956
2021/0294323 A1* 9/2021 Bentahar ............... B60W 50/00
2021/0362707 A1 11/2021 Pauls et al.
2021/0370921 A1* 12/2021 Silva ................ B60W 60/0027
2021/0394757 A1* 12/2021 Beller .................. G05D 1/0088
2022/0153310 A1* 5/2022 Yang ................. B60W 60/0027
2022/0153313 A1 5/2022 Honka
2022/0234618 A1* 7/2022 Kabzan ............. B60W 50/0097
(Continued)

FOREIGN PATENT DOCUMENTS

CA 3139449 A1 * 5/2022 ............... G06N 7/01
CN 116507541 A * 7/2023 ............. G05D 1/646
(Continued)

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
(Continued)

*Primary Examiner* — Fadey S. Jabr
*Assistant Examiner* — Ahmed Alkirsh
(74) *Attorney, Agent, or Firm* — Knobbe, Martens, Olson & Bear, LLP

(57) ABSTRACT

A method that includes obtaining, using at least one processor, sensor data associated with an environment in which an autonomous vehicle (AV) is in operation. The method includes determining, using the at least one processor, an intended action of the AV based on the environment in which the AV is in operation. The method includes determining, using the at least one processor, an action for the AV based on the intended action of the AV and an agent prediction.

20 Claims, 10 Drawing Sheets

(56) References Cited

U.S. PATENT DOCUMENTS

| | | | | |
|---|---|---|---|---|
| 2022/0315051 | A1* | 10/2022 | Patel | B60W 40/04 |
| 2022/0396289 | A1* | 12/2022 | Li | G01C 21/3602 |
| 2023/0053459 | A1 | 2/2023 | You | |
| 2023/0202529 | A1* | 6/2023 | Cui | B60W 60/00276 701/26 |
| 2023/0308243 | A1* | 9/2023 | Hao | H04L 5/0048 |
| 2024/0202393 | A1* | 6/2024 | Dobre | B60W 60/0011 |

FOREIGN PATENT DOCUMENTS

| | | | | |
|---|---|---|---|---|
| DE | 10 2019 134 922 | A1 | 6/2021 | |
| EP | 3819183 | A2 | 5/2021 | |
| WO | WO-2020205648 | A1 * | 10/2020 | G06N 20/00 |

OTHER PUBLICATIONS

International Search Report and Written Opinion received for PCT Patent Application No. PCT/US2023/072027, mailed Nov. 7, 2023.

International Preliminary Report received for PCT Application No. PCT/US2023/072027, mailed Feb. 27, 2025.

* cited by examiner

DETERMINATION OF AN ACTION FOR AN AUTONOMOUS VEHICLE IN THE PRESENCE OF INTELLIGENT AGENTS

BACKGROUND

Human drivers signal to each other on the road and are able to ascertain whether intelligent agents, such as other drivers, are aware of their intentions. Likewise, connected vehicles can communicate their intentions to each other by means of their communication systems.

However, in the absence of communication networks for connected vehicles, or when connected vehicles interact with non-connected vehicles or other agents in their environment, it can be problematic to ensure that a vehicle's intention is perceived by the other agents.

DETAILED DESCRIPTION

Figure 1:
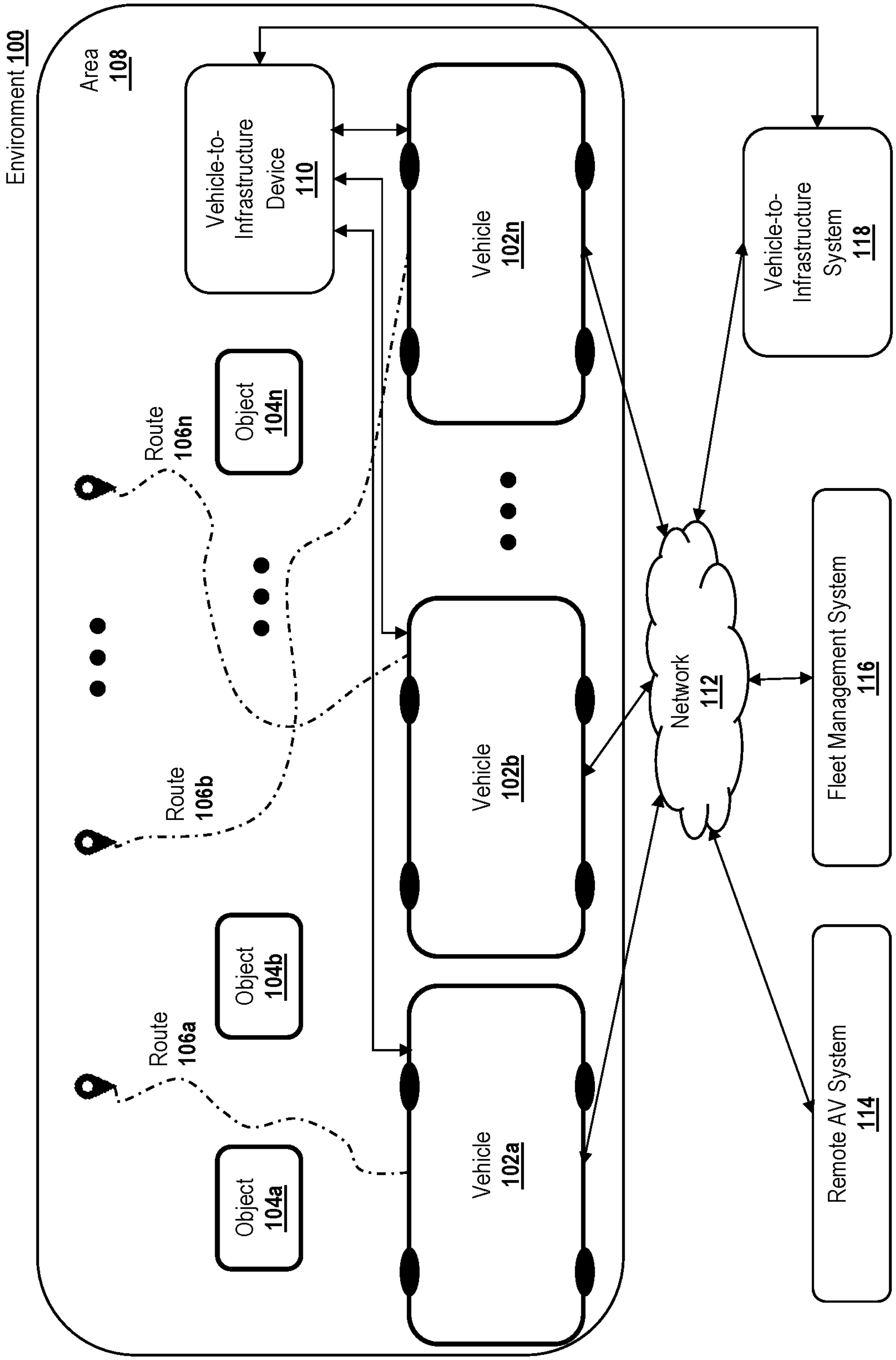
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a method that includes obtaining, using at least one processor, sensor data associated with an environment in which an autonomous vehicle (AV) is in operation. The environment includes at least one agent. The method includes determining, using the at least one processor, an intended action of the AV based on the environment in which the AV is in operation. The method includes determining, using the at least one processor, an agent prediction indicative of an action that the agent expects the AV to perform based on the environment in which the AV is in operation. The method includes determining, using the at least one processor, an action for the AV based on the intended action of the AV and the agent prediction. In one or more example embodiments or examples, the method includes providing, using the at least one processor, operation data associated with performance of the action to cause the AV to operate based on the action for the AV.

By virtue of the implementation of systems, methods, and computer program products described herein, techniques for determining an action for an autonomous vehicle are provided. Some of the advantages of these techniques are that the AV can communicate intentions (such as an intended action) to other agents, even in absence of communication network for connected vehicles. The AV can determine and perform an action, which may or may not correspond to the intended action, based on its perception of the agents' acknowledgment of the intended action. The disclosure allows planning actions that influence an agent's behavior (such as actions that increase the likelihood of an agent being aware of the AV's intention). The AV can benefit from more safety by virtue of implementation of the communication of an intended action between the AV and other agents. The AV can be seen as more interactive with agents in its environment. Because of the AV's ability to infer the agents' acknowledgment of the intended action, the AV can advantageously perform maneuvers that are safer and lead to a more efficient driving (for example, by allowing the AV to reach its destination in less time and/or diminishing the likelihood of the AV being involved in traffic jams). In other words, the AV can safely execute maneuvers that are less conservative than in AVs not provided with the systems, methods and computer programs described herein. Furthermore, since the AV can benefit from more safety, can be seen as more interactive with agents and/or can drive more efficiently, trust in AVs can increase among roads users.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 9:
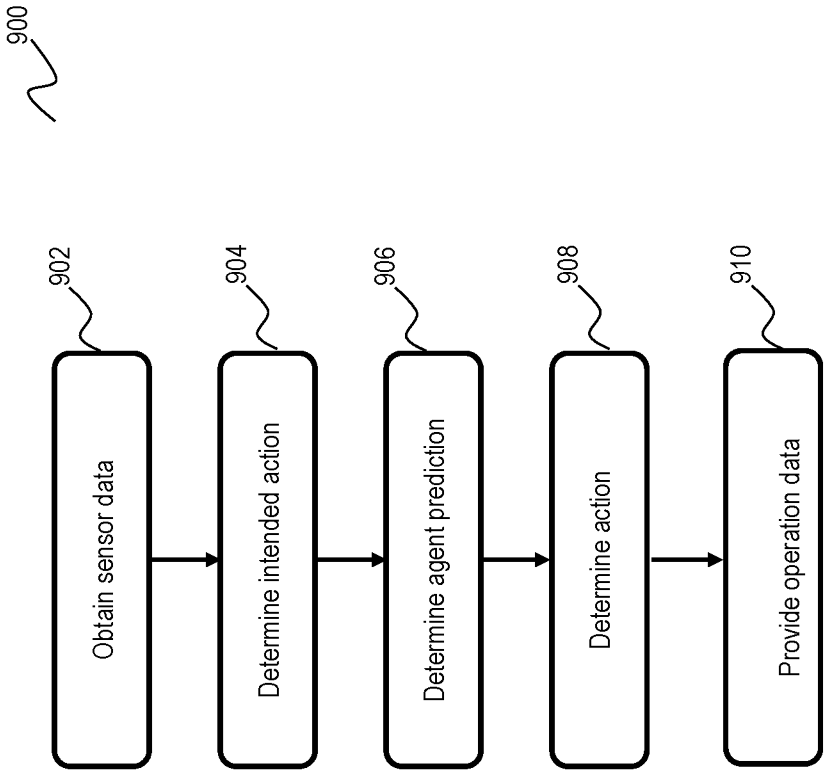
FIG. 9 is a flowchart of an example process for determination of an action.

In some embodiments, device 300 is configured to execute software instructions of one or more steps of the disclosed method, as illustrated in FIG. 9.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
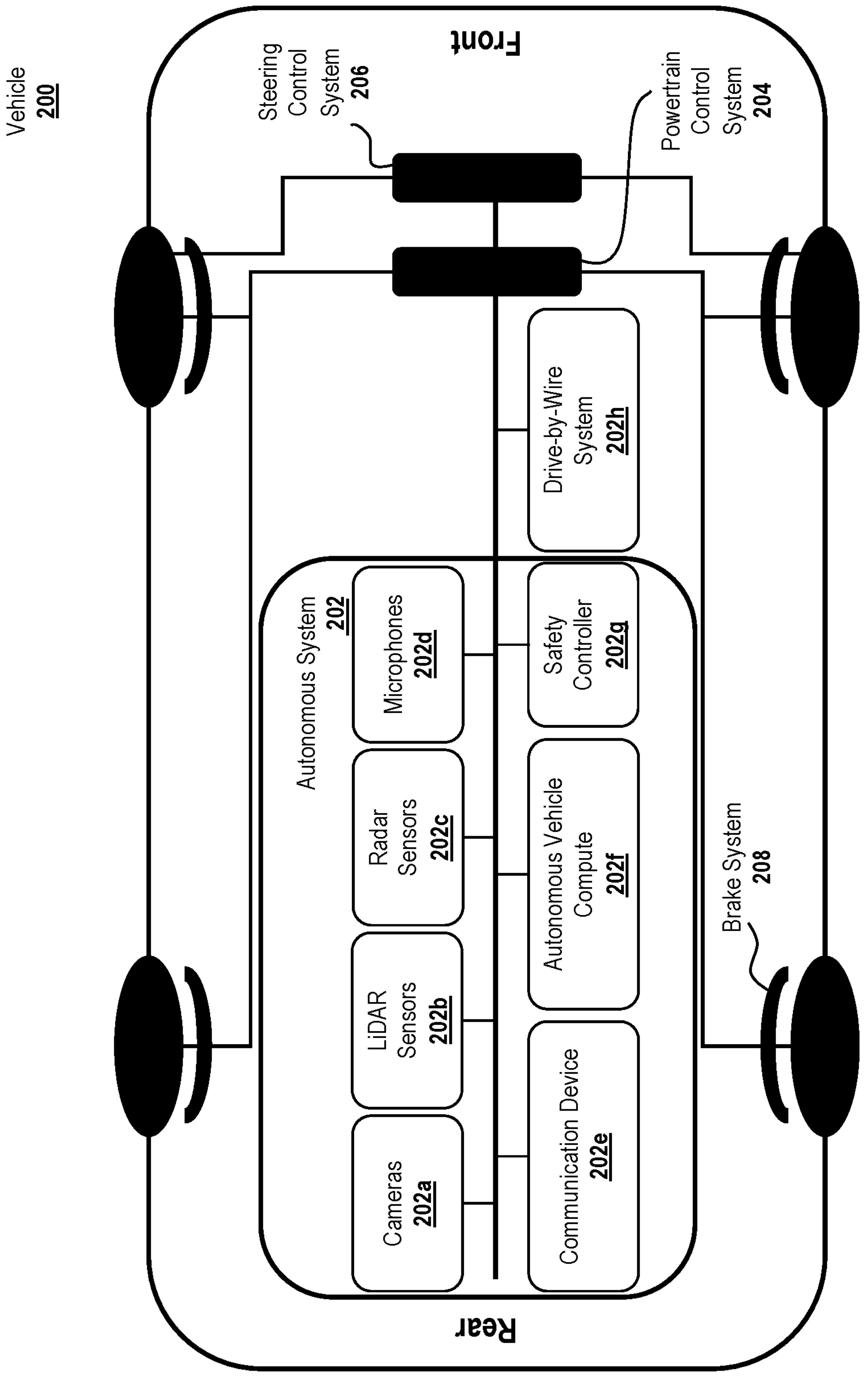
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
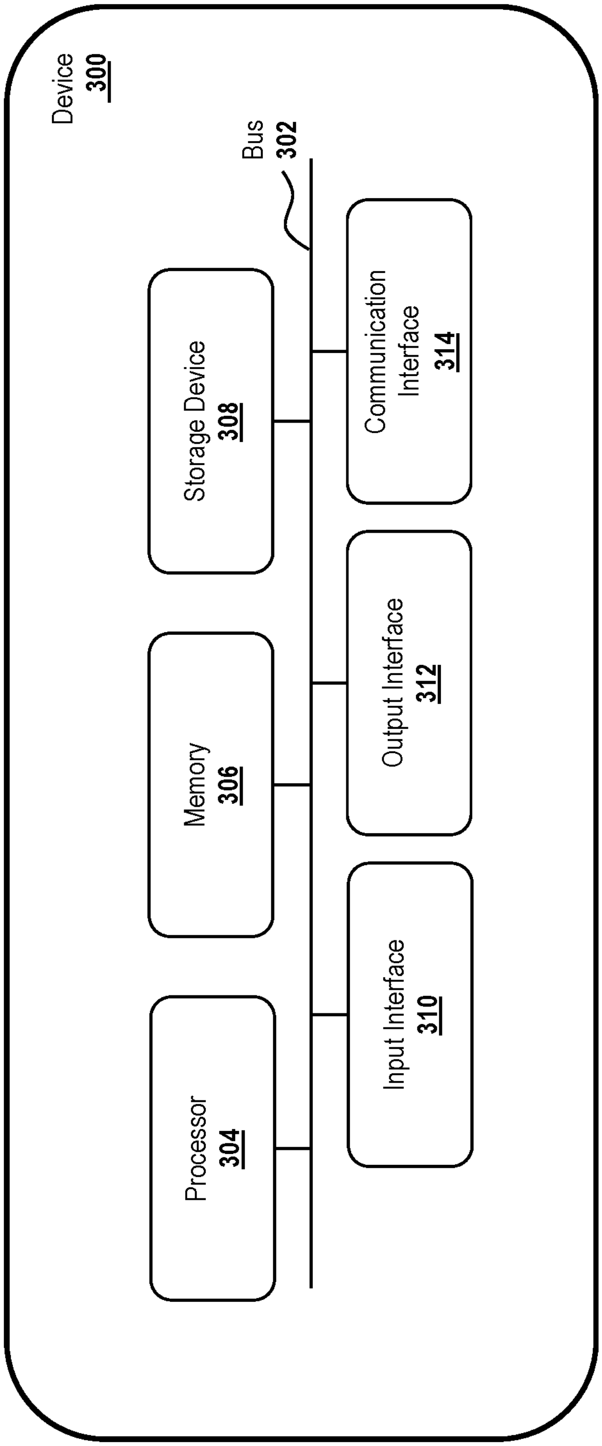
FIG. 3 is a diagram of components of one or more example devices and/or one or more example systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
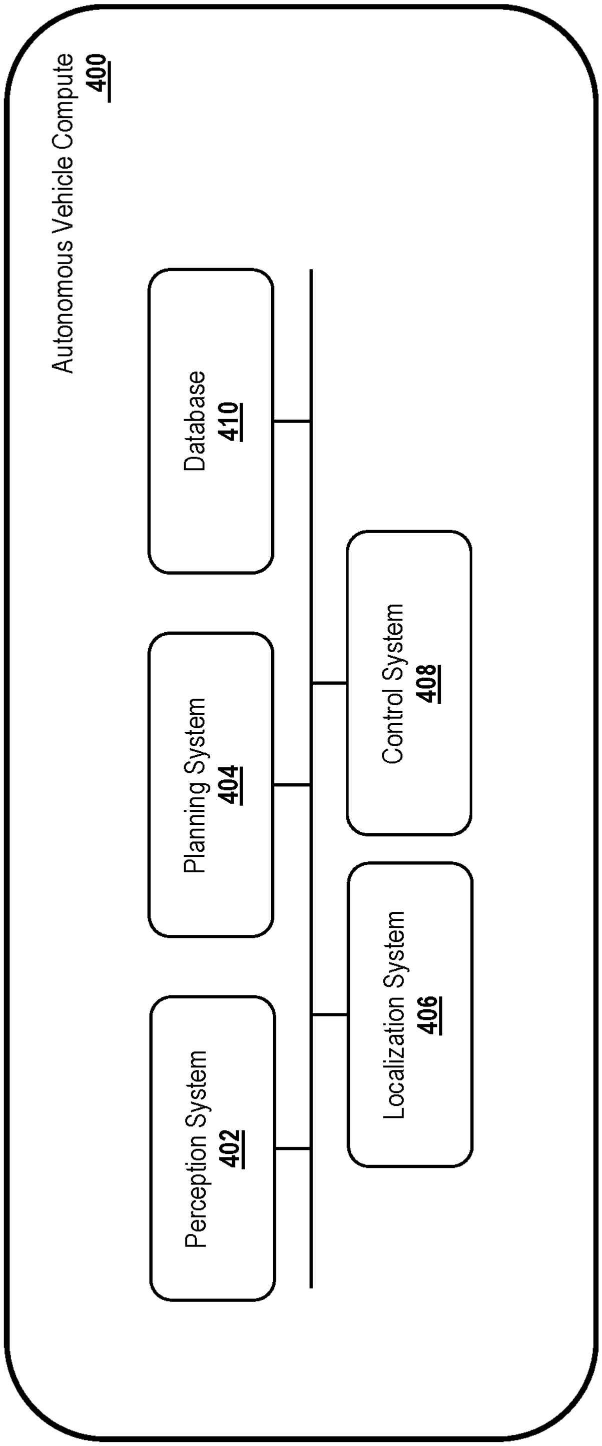
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

The present disclosure relates to systems, methods, and computer program products that determine and perform actions (e.g., signaling action, a slowing down, a speeding up action, an activation of flashing lights, a movement forward, a yielding, a blocking action, or any other suitable action) for an autonomous vehicle based at least on an intended action of the autonomous vehicle and on an agent prediction internal state of an autonomous vehicle. The determination of the action for the AV is, in some example embodiments or examples, further based on an agent profile which can be estimated for each for each tracked agent. A probabilistic model for the agent prediction can be provided to guide predictions of agent behavior.

Figure 5:
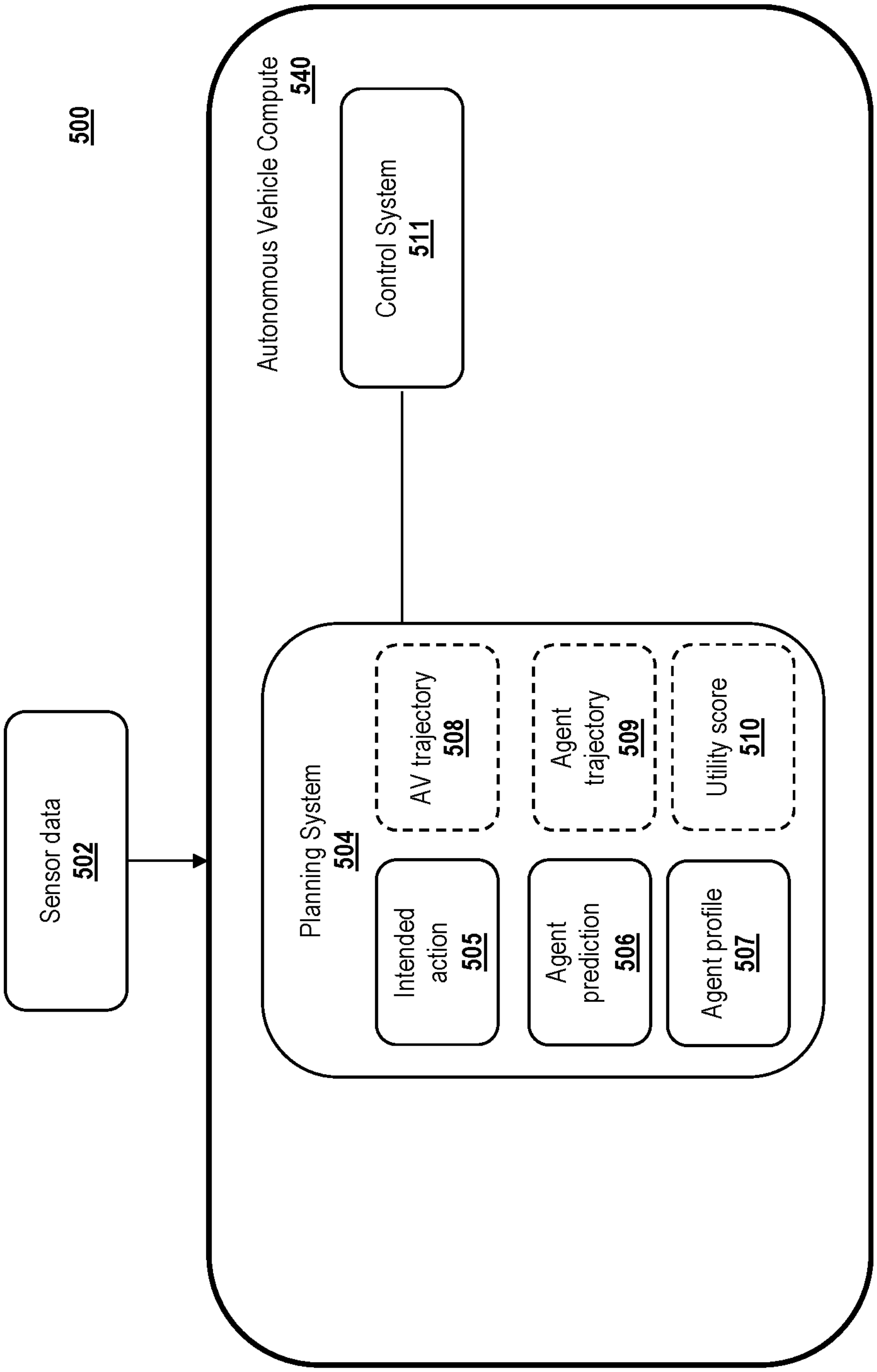
FIG. 5 is a diagram of an example implementation of a process for determination of an action, such as a signaling action.

Referring now to FIG. 5, illustrated is a diagram of a system 500 for determination of an action. In some embodiments, system 500 is connected with and/or incorporated in a vehicle (e.g., an autonomous vehicle that is the same as, or similar to, vehicle 102, 200, 600 of FIG. 1, FIG. 2, and FIG. 6, respectively). In one or more embodiments or examples, system 500 is in communication with and/or a part of an AV (e.g., such as Autonomous System 202 illustrated in FIG. 2, device 300 of FIG. 3), an AV system, an AV compute (such as AV compute 202*f* of FIG. 2 and/or AV compute 400 of FIG. 4), a remote AV system (such as remote AV system 114 of FIG. 1), a fleet management system (such as fleet management system 116 of FIG. 1), and a V2I system (such as V2I system 118 of FIG. 1). The system 500 can be for operating a vehicle. In one or more examples, the system 500 can be for operating an autonomous vehicle.

In one or more embodiments or examples, the system 500 is in communication with one or more of: a device (such as device 300 of FIG. 3), a localization system (such as localization system 406 of FIG. 4), a planning system (such as the planning system 404 of FIG. 4), a perception system (such as the perception system 402 of FIG. 4), and a control system (such as the control system 408 of FIG. 4). In one or more embodiments or examples, the system 500 includes one or more of: a planning system 504, a perception system 502, and a control system 511 that are the same as, or similar to, the planning system 404, the perception system 402, and the control system 408 of FIG. 4, respectively.

A system 500 is disclosed. The system 500 includes at least one processor. The at least one processor can be included in an AV compute 540. The system 500 includes at least one memory storing instructions thereon that, when executed by the at least one processor, cause the at least one processor to perform operations including obtaining sensor data 502 associated with an environment in which an autonomous vehicle (AV) is operating. The environment can include an agent. As used herein, "agent" can denote an element, belonging to the environment in which an AV is operating, which has the capability to perceive an action from the AV. In one or more examples, the agent has and/or is capable of a dynamic behavior. The agent is, for example, one or more of: an actor (such as another vehicle) and road user. In one or more embodiments or examples, the sensor data 502 is generated by at least one sensor of an autonomous vehicle operating in the environment. A perception system (such as perception system 402 of FIG. 4) can be configured to obtain the sensor data 502.

The operations include determining, using the at least one processor, an intended action 505 of the AV based on the environment in which the AV is in operation. In one or more example embodiments or examples, the intended action 505 is associated with intended action data. The intended action data can be indicative of a high-level intention of the AV, such as one or more of: a lane change, a maneuver to park in spot, a maneuver to pull over, a maneuver to "go next" at a stop sign and any other suitable high-level intention of the AV. As used herein, a "high-level intention of the AV" can denote an intended action 505 of the AV including a maneuver that is intended to be performed by the AV within its visible range within a specified timeframe. In one or more examples or embodiments, an intended action 505 is any action (e.g., a dynamic action) that the AV is capable of taking within a specified timeframe.

The operations include determining, using the at least one processor, an agent prediction 506 indicative of an action that the agent expects the AV to perform based on the environment in which the AV is in operation. In one or more example embodiments or examples, the agent prediction 506 is an AV estimated state indicative of the AV's estimation of the information the agent has about the intended action 505 of the AV. In an example, the AV estimated state is a representation of the agent's high-level information about the intended action 505 of the AV, such as a probabilistic "Hidden Knowledge State" (HKS). The HKS can denote what the AV thinks the agent knows about the intended action 505 of the AV. The system 500, for example, uses a planning system 504 (similar to planning system 404 of FIG. 4) for the agent prediction 506.

The operations include determining, using the at least one processor, an action for the AV based on the intended action 505 of the AV and the agent prediction 506. In one or more example embodiments or examples, the action for the AV is an action or operation to be performed by the AV. The action or operation to be performed by the AV can be one or more of: a signaling action, a slowing-down action, a speeding-up action, an action to activate flashing lights, an action to move forward, an action to yield way, an action to actively block way and any other suitable action. The action of the AV can be associated with action data. The operations include providing, using the at least one processor, operation data associated with performance of the action to cause the AV to operate based on the action for the AV. In other words, the system 500, for example, determines an action that the AV is going to take (e.g., the intended action 505). The system then, for example, determines whether other vehicles or pedestrians (e.g., agents) understand that the AV is going to take the intended action 505 (e.g., by means of the agent prediction 506). Based on this determination, the system 500 can be configured to determine an action for the AV, which may or may not be the same as the intended action 505 of the AV, and takes the action.

In one or more example embodiments or examples, the operations include obtaining an agent profile 507 for the agent. As used herein, "agent profile" can denote a profile indicative of a behavior pattern of an agent. In one or more example embodiments or examples, the agent profile 507 is one or more of: a passive profile and an aggressive profile.

In one or more example embodiments or examples, obtaining the agent profile 507 includes estimating, based on the sensor data, the agent profile 507. In other words, in one or more example embodiments or examples, the at least one processor utilizes sensor data 502 to assess the agent profile 507.

In one or more example embodiments or examples, determining the action for the AV includes determining the action based on the intended action 505 of the AV, the agent prediction 506 and the agent profile 507. By considering the agent profile 507 for the determination of the action for the AV, the action for the AV can be more accurately tailored to the environment in which the AV is in operation. For example, the AV takes a specific action based on a determined or estimated agent profile 507 in order to best react to an agent present in the environment.

In one or more example embodiments or examples, the operations further include predicting, based on the sensor data, an agent trajectory 509. In one or more example embodiments or examples, determining the action for the AV includes determining the action for the AV based on the intended action 505 of the AV, the agent prediction 506 and the predicted agent trajectory 509. By considering the predicted agent trajectory 509 for the determination of the action for the AV, the action for the AV can be more accurately tailored to the environment in which the AV is in operation. For example, the AV takes a specific action based on a predicted agent trajectory 509 in order to best react to an agent present in the environment.

In one or more example embodiments or examples, the operations further include obtaining further sensor data associated with the environment after the action for the AV is performed by the AV. In one or more example embodiments or examples, the system includes updating, based on the further sensor data, the agent prediction 506. Therefore, the agent prediction 506 can be updated according to the reaction of the agent to the performed action. In an example, the performed action for the AV includes choosing a trajectory with signaling actions, and the updated agent prediction 506 includes an AV's estimation of the agent's knowledge about the subsequent intention of the AV, based on the agent's expected observation of the trajectory and the signaling actions of the AV. For example, the AV can perform the action of signaling a change of trajectory and the agent is determined to slow down in response to such signaling. The system 500 can then update the agent prediction 506 as the further sensor data captures the agent's response.

In one or more example embodiments or examples, the operations further include updating, based on the update of the agent prediction 506, the predicted agent trajectory 509. Accordingly, a subsequent determination of the action for the AV can be based on the updated agent prediction 506 and the updated predicted agent trajectory 509.

In one or more example embodiments or examples, the operations further include predicting a change in the agent prediction 506 based on one or more of: the agent prediction 506, the action for the AV, the agent profile 507, and the predicted agent trajectory 509. The change in the agent prediction 506 can be denoted by quantifying an amount of change (such as a change in a percentage) of the agent prediction 506. In one or more example embodiments or examples, the operations include determining a utility score 510 associated with the predicted change in the agent prediction 506 based on one or more of: the agent prediction 506, the action for the AV, the agent profile 507, and the predicted agent trajectory 509. Put another way, the at least one processor can be provided with one or more of the following inputs: a current agent prediction 506, an action for the AV (such as a signaling action), an agent profile 507, and a predicted agent trajectory 509. The at least one processor can output an expected change in the agent prediction 506 and a utility score 510 associated with such change. The utility score 510 can be indicative of how useful the change in the agent prediction 506 is relative to a criterion that is selected for optimization.

In one or more example embodiments or examples, predicting the change in the agent prediction 506 includes determining a transition function between a current state and a next state. In one or more example embodiments or examples, the current state is representative of one or more of: the agent prediction 506, the action for the AV, the agent profile 507 and the predicted agent trajectory 509. The transition function is, for example, determined using one or more of: machine learning and neural network. In one or more example embodiments or examples, the operations include providing a game tree representative of an interaction between the AV and the agent, and exploring the game tree. For example, a game tree can be relied upon as a way to generate probabilities for possible outcomes in a particular (e.g., turn-based) model of interaction between the AV and one or more agents. Put another way, the game tree can be used to determine or estimate the effect that an action for the AV will have on the agent prediction 506 and on potential reactions of other agents. Accordingly, a tree of possible outcomes for such action for the AV (optionally followed by a sub-tree of possible actions the other agents might take) can be explored. This tree (and its sub-trees) can go to arbitrary depth and, from it, the probability of various outcomes starting from an action for the AV can be estimated (for instance, the probability of the agent yielding to the AV's maneuver to change lane). In other words, in some examples, the game tree is a tool to estimate the probability of an outcome resulting from an action for the AV. Such probability can be used to update a model of one or more agents' predictions.

In one or more example embodiments or examples, the operations further include determining, based on the utility score 510, an AV trajectory 508. Since the utility score 510 is representative of the utility of a change in the agent prediction 506, for example the utility of the agent prediction 506 to determine an action for the AV, the utility score 510 can be used to determine an AV trajectory 508 corresponding to an action for the AV that is based on an agent prediction 506 with a utility score 510 higher than a utility threshold. This way, the utility score 510 can be incorporated into a trajectory realizer's cost structure to allow for actions for the AV with high utility score 510. In other words, the utility score 510 can be seen as a quantifier of desirable behavior, such as behavior of the agent that is favorable for the AV. An isolation of the modelled interaction can allow to discretize a search space into a classical tree structure.

In one or more example embodiments or examples, the environment includes a plurality of agents. In one or more example embodiments or examples, the operations further include filtering, based on a criterion, the agent among the plurality of agents. In one or more example embodiments or examples, the operations include filtering, based on a criterion, a subset of agents among the plurality of agents. In one or more example embodiments or examples, the criterion is based on one or more of: an agent position with respect to the AV, an agent constraining the action for the AV, a difference between the intended action 505 of the AV and the agent prediction 506, and any other suitable criterion. The criterion can allow for a filtering of the agent or agents which are the most relevant for the AV, the circumstances of the AV and the intended action 505 of the AV. Put another way, specific agents can be filtered out if deemed to be uninteresting according to heuristic or learned criteria, for example when expanding a tree modelling the interaction of the AV and the plurality of agents.

In one or more example embodiments or examples, determining the intended action 505 of the AV and the agent prediction 506 includes obtaining an AV internal state including the intended action 505 of the AV and the agent prediction 506. The AV internal state can be seen as a state of the AV that can be used to determine an action for the AV. The AV internal state, in one or more example embodiments or examples, includes the agent profile 507 in addition to the intended action 505 of the AV and the agent prediction 506.

In one or more example embodiments or examples, the action for the AV includes one or more of: a signaling action, a velocity action, and a maneuver. The signaling action can be one or more of: an activation of a blinker, an activation of a turning light, an activation of a flashing light, and any other suitable signaling action. The velocity action can be one or more of: a slowing down action, a speeding up action, and any other suitable velocity action. The maneuver can be one or more of: a forward movement, a movement towards and edge of a lane, a yielding action, a blocking action, and any other suitable maneuver.

Figure 6:
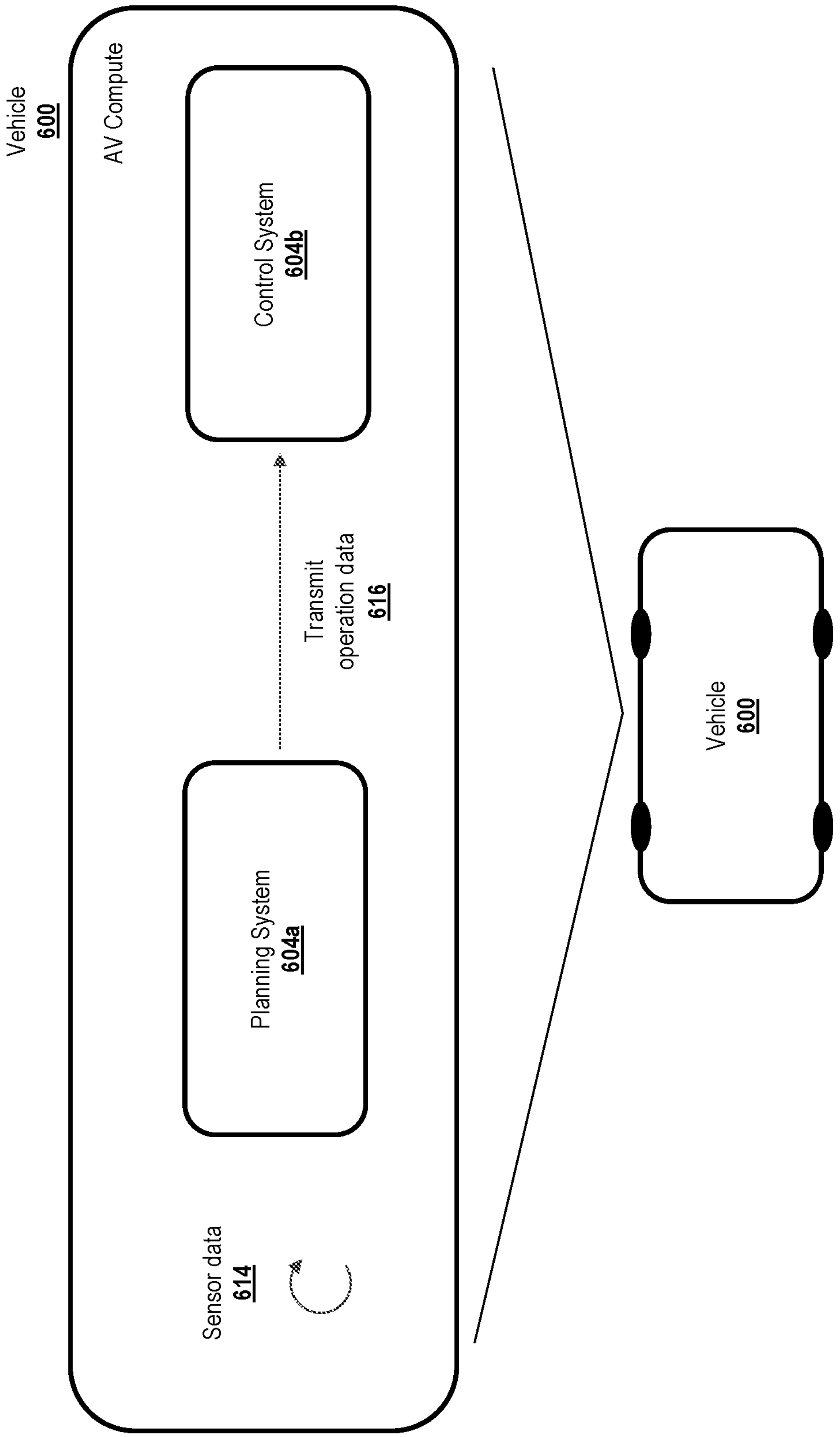
FIG. 6 is a diagram of an example vehicle including a planning system and a control system for determination of an action.

Referring now to FIG. 6, operation data 606, such as the operation data mentioned in relation to FIG. 5, is transmitted, in one or more embodiments or examples, in an AV 600 from a planning system 604*a* to a control system 604*b*. The planning system 604*a* and the control system 604*b* can be the same as, or similar to, the planning system 504 and the control system 508 of FIG. 5, respectively. The planning system 604*a* can include at least one processor, such as the at least one processor of the embodiments or examples of FIG. 5. The operation data 616 is provided, using the at least one processor, as indicated for the embodiments or examples of FIG. 5, that is, relying on sensor data 614 obtained by using the at least one processor. The operation data 616 is, for example, intended to cause the AV to operate based on the action for the AV. In certain examples, the control system 604*b* of FIG. 6 is intended to control such operation according to the operation data.

Control data can be generated for a control system of an autonomous vehicle. Control data can be provided to a control system of an autonomous vehicle. Control data can be transmitted to, e.g., a control system of an autonomous vehicle and/or an external system. A control system (of an autonomous vehicle and/or an external system) can be controlled based on control data.

In one or more examples or embodiments, the sensor data 614 is one or more of: radar sensor data, non-radar sensor data, camera sensor data, image sensor data, audio sensor data, LIDAR sensor data and any other suitable sensor data. The particular type of sensor data is not limiting. For example, the sensor data 614 is indicative of an environment around an autonomous vehicle. The sensor data 614 is, in some examples, indicative of an object, or a plurality of objects, in the environment around an autonomous vehicle.

A sensor can be one or more sensors, such as a first onboard sensor. The sensor can be associated with the autonomous vehicle. An autonomous vehicle can include one or more sensors that can be configured to monitor an environment where the autonomous vehicle operates through sensor data 614. For example, the monitoring can provide sensor data 614 indicative of what is happening in the environment around the autonomous vehicle, such as for determining trajectories of the autonomous vehicle. Sensors can include one or more of the sensors illustrated in FIG. 2 (such as cameras 202*a*, LiDAR sensors 202*b*, radar sensors 202*c*, and microphones 202*d*).

Figure 7:
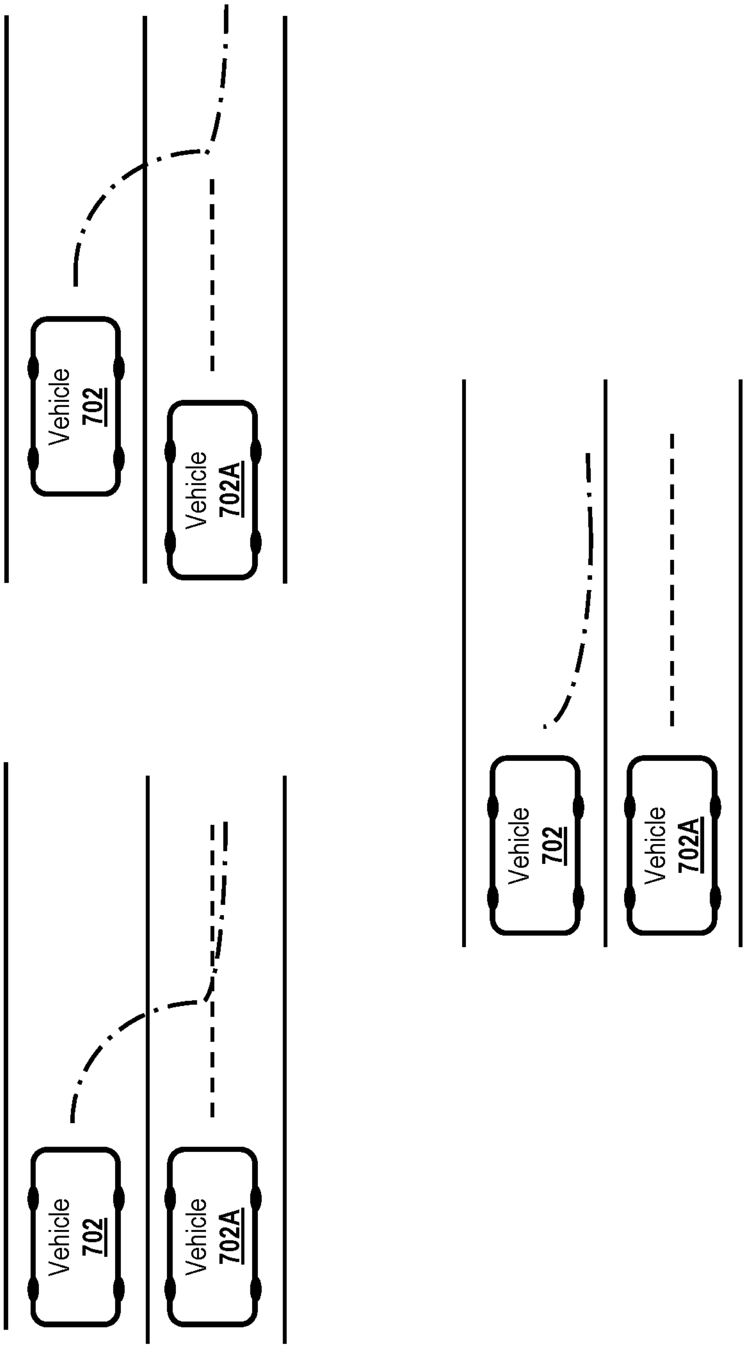
FIG. 7 is a diagram depicting example determination of actions of example vehicles.

Referring now to FIG. 7, a first vehicle 702 is an AV configured to carry out one or more of the methods disclosed herein, such as by including the system 500 of FIG. 5. The first vehicle 702 determines an intended action, namely to change lanes from the left lane to the right lane of a two-lane road. The intended action is determined, using at least one processor, based on the environment in which the AV is in operation, such as based on high-density traffic on the left lane or a change to the right lane being required to subsequently turn right at a junction.

The first vehicle 702 determines, using the at least one processor, an agent prediction for a second vehicle 702A (which is an agent) indicative of a first vehicle's 702 estimation of an action (such as a maneuver) that the second vehicle 702A expects the first vehicle 702 to perform, based on the environment in which the first vehicle 702 is in operation. In other words, the first vehicle's 702 prediction for the second vehicle 702A is indicative of what the first vehicle 702 predicts regarding the knowledge of the second vehicle 702A about the first vehicle 702's intention to perform a maneuver. In FIG. 7, the first vehicle's 702 prediction for the second vehicle 702A is that the second vehicle 702A is unlikely to have any knowledge about the first vehicle 702's intention to change to the right lane. As a result, as represented in FIG. 7, upper-left corner, the intention of the first vehicle 702 collides with the intention of the second vehicle 702A.

In order to change the knowledge of the second vehicle 702A about the first vehicle 702's intention to perform a maneuver (and, in consequence, the prediction for the second vehicle 702A), the first vehicle determines an action consisting of nudging to the edge of the left lane and activating the right turn signal. The first vehicle 702 operates based on such action (that is, it performs the actions), for example via a control system which is provided with operation data associated with the performance of the action. This is shown in FIG. 7, bottom. Accordingly, the at least one processor of the first vehicle 702 updates the prediction for the second vehicle 702A. At the instant represented in FIG. 7, bottom, the first vehicle's 702 prediction for the second vehicle 702A is that the second vehicle is likely to have knowledge about the first vehicle 702's intention to change to the right lane.

At the instant represented in FIG. 7, upper-right corner, the second vehicle 702A is slowing down to give way. This action is perceived by the first vehicle 702 (for example, using the at least one processor, which can process sensor data associated with the environment in which the first vehicle 702 is in operation). As a result, the at least one processor of the first vehicle 702 updates the prediction for the second vehicle 702A. At the instant represented in FIG. 7, upper-right corner, the first vehicle's 702 prediction for the second vehicle 702A is that the second vehicle does most likely have knowledge about the first vehicle 702's intention to change to the right lane. The first vehicle 702 can then determine the action of changing to the right lane, based on the intended action of the first vehicle 702 and the updated prediction for the second vehicle 702A. This action can also be performed by the first vehicle 702 using the control system.

Figure 8A:
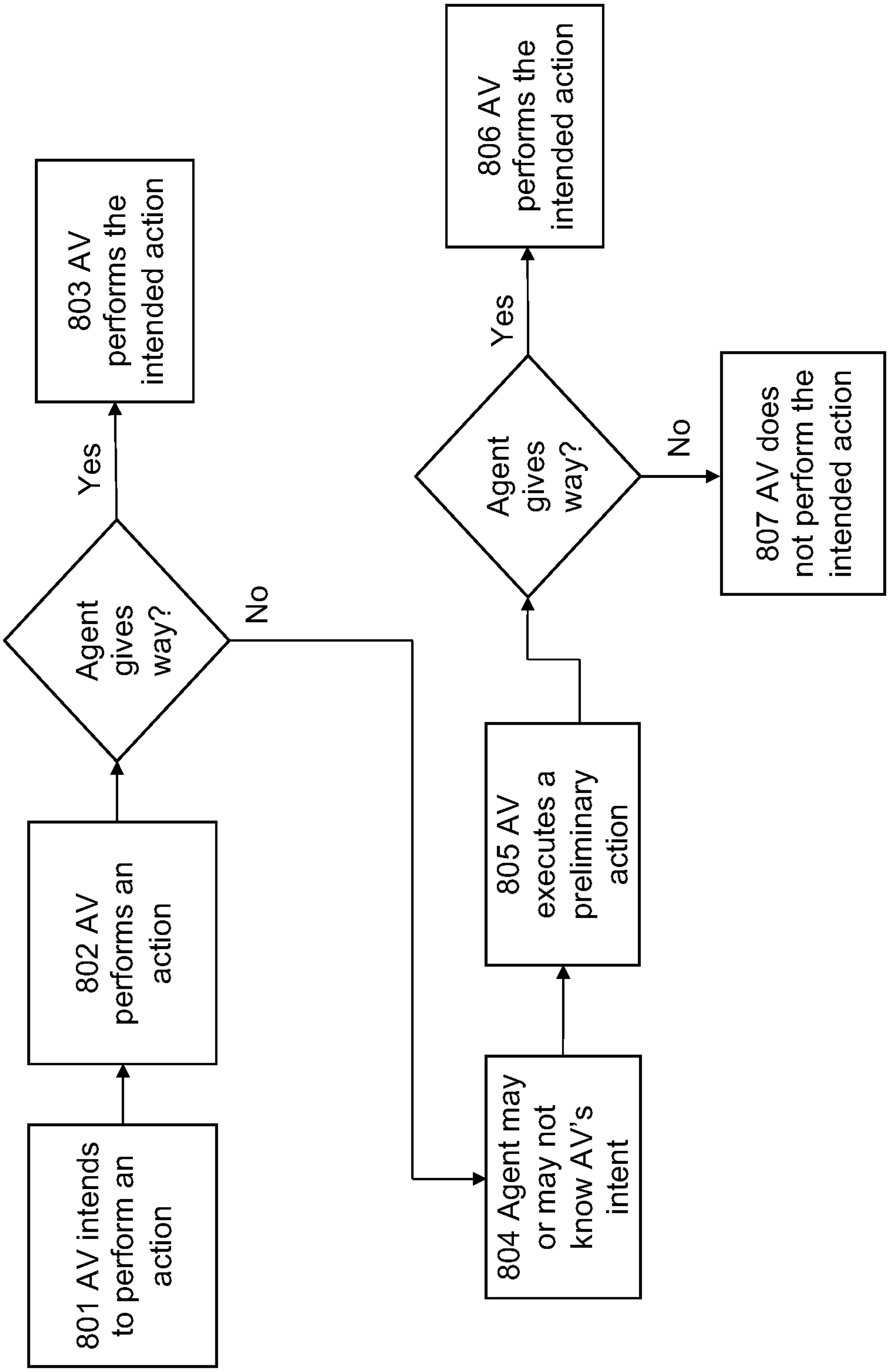
FIG. 8A, 8B are flowcharts of example determination of actions for autonomous vehicles.
Figure 8B:
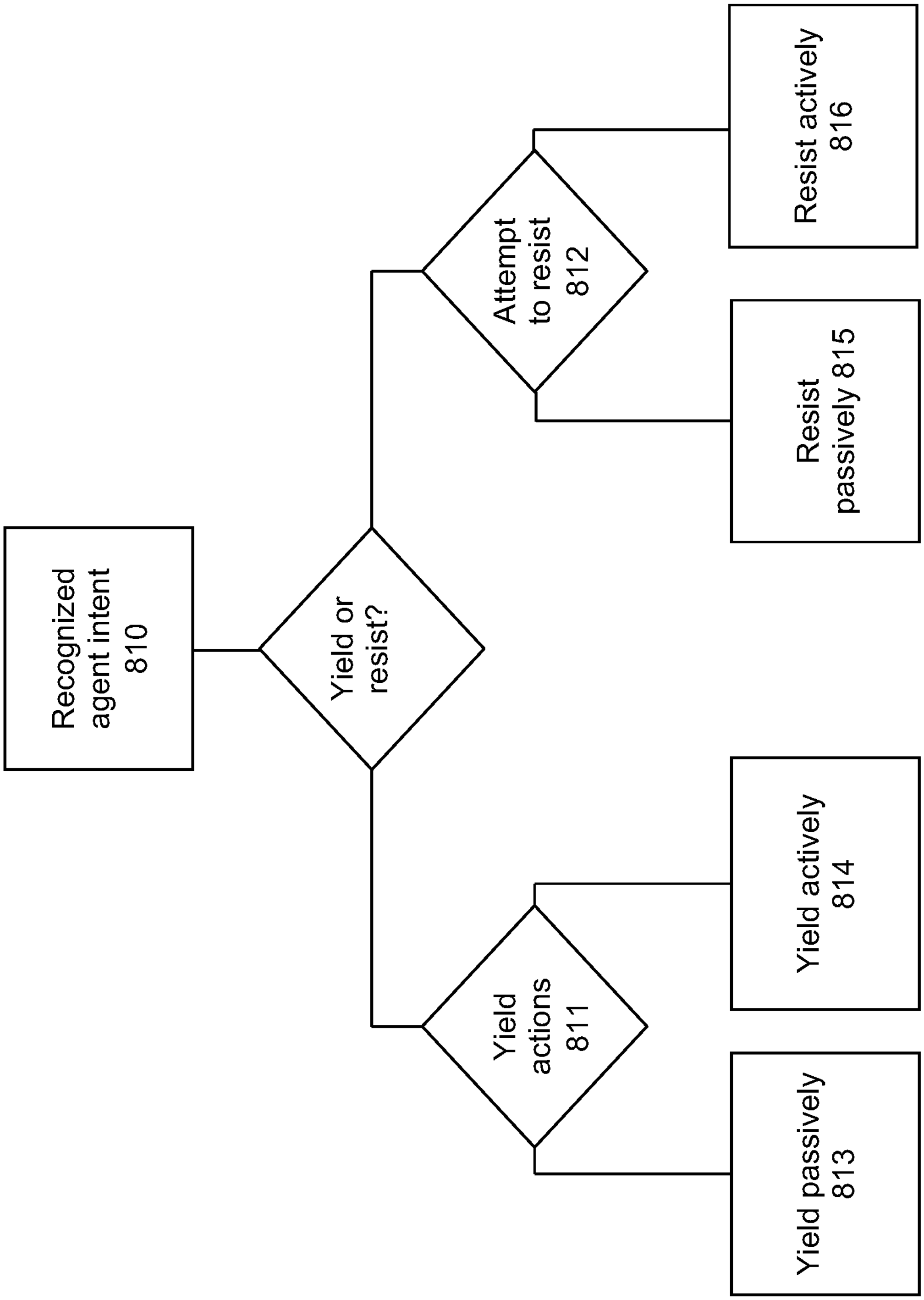

Referring now to FIGS. 8A and 8B, flowcharts for example determination of actions for an AV are provided.

In the example of FIG. 8A, at least one processor of an AV determines, at step 801, an intended action, such as a maneuver. At such instant, as was set out with reference to FIG. 7, an agent prediction is that that an agent is unlikely to have any knowledge about the AV's intention to perform a maneuver.

As a result from such determination of the agent prediction, the at least one processor of the AV determines an action, based on the intended action of the AV and the agent prediction, such as the activation of a turn signal. When the AV operates, at step 802, based on such action (for example, when the turn signal is activated), the at least one processor of the AV updates the agent prediction. At such instant, the agent prediction is that the agent is more likely to have knowledge about the AV's intention to perform the maneuver.

If the agent gives way, the at least one processor of the AV updates the agent prediction. At such instant, the agent prediction is that the agent is highly likely to have knowledge about the AV's intention to perform the maneuver. The AV can then determine the action of performing the maneuver, based on the intended action of the AV and the updated agent prediction. This action can also be performed, at step 803, by the AV using the control system.

If the agent does not give way, the at least one processor of the AV updates the agent prediction. At such instant, the agent prediction is that the agent is less likely to have knowledge about the AV's intention to perform the maneuver, that is, the AV estimates, at step 804, that the agent may or might not now about the AV's intention. As a result from such update of the agent prediction, the at least one processor of the AV determines a further action (such as nudging towards the edge of the lane along which it is circulating) based on the intended action of the AV and the updated agent prediction. This further action can also be performed, at step 805, by the AV using the control system. When the AV operates based on such action (for example, when AV nudges towards the edge of the lane along which it is circulating), the at least one processor of the AV updates the agent prediction. At such instant, the agent prediction is that the agent is even more likely to have knowledge about the AV's intention to perform the maneuver.

When the agent gives way, the at least one processor of the AV updates again the agent prediction. At such instant, the agent prediction is that the agent does almost certainly have knowledge about the AV's intention to perform the maneuver. The AV can then determine the action of performing the maneuver, based on the intended action of the AV and the updated agent prediction. This action can also be performed, at step 806, by the AV using the control system.

When the agent does not give way, the at least one processor determines an action to remain on the current lane, that is, not to perform, at step 807, the intended action.

Referring now to FIG. 8B, it is noted that an intended action of an AV, based on the environment in which the AV is in operation, can be based on a recognized agent intent 810. At least one processor of the AV can obtain sensor data indicative of the recognized agent intent. The recognized agent intent is, for example, an intent to merge in. Account taken of the recognized agent intent, the intended action of the AV, based on the recognized agent intent, can be divided into yield actions 811 and attempt-to-resist actions 812. As used herein, a "yield action" can be seen as an action in which the AV adapts to the recognized agent intent with the aim of avoiding merging in. As used herein, an "attempt-to-resist action" can be seen as an action in which the AV forces the agent to modify the recognized agent intent with the aim of avoiding merging in.

The yield actions 811 can in turn be divided into yielding to the recognized agent intent either passively 813 (that is, with no behavior change) or actively 814 (that is, with a behavior change, such as an intended action of the AV to make space for the agent). Likewise, the attempt-to-resist actions can in turn be divided into resisting to the recognized agent intent either passively 815 (that is, with no behavior change) or actively 816 (that is, with a behavior change, such as an intended action of the AV to reduce available space for the agent).

The at least one processor processes the intended action of the, together with an agent prediction (which can be determined by the at least one processor as set out in the exemplary embodiments or examples provided herein), to determine an action for the AV. The actions for the AV can correspond to the intended actions of the AV indicated in FIG. 8A, in particular when the agent prediction is indicative of the fact that the agent is highly likely to have knowledge about the AV's intended action.

Referring now to FIG. 9, illustrated is a flowchart of a method or process 900 for determining an action for the AV, such as for operating and/or controlling an AV. The method 900 can be performed by any suitable system. The method 900 can be performed by any system disclosed herein, such as one or more of: an AV compute 202*f* of FIG. 2; an AV compute 400 of FIG. 4; a vehicle 102, 200 of FIGS. 1 and 2, respectively; a device 300 of FIG. 3; an AV compute 540 of FIG. 5; and implementations of FIGS. 6, 7, 8A and 8B. The system disclosed can include at least one processor which can be configured to carry out one or more of the operations of method 900. The method 900 can be performed (e.g., completely, partially, and/or the like) by another device or group of devices separate from or including system disclosed herein.

In one or more example embodiments or examples, the method 900 includes obtaining, at step 902, using at least one processor, sensor data associated with an environment in which an autonomous vehicle (AV) is in operation. In one or more example embodiments or examples, the environment includes an agent. In one or more example embodiments or examples, the method 900 includes determining, at step 904, using the at least one processor, an intended action of the AV based on the environment in which the AV is in operation. In one or more example embodiments or examples, the method 900 includes determining, at step 906, using the at least one processor, an agent prediction indicative of an action that the agent expects the AV to perform based on the environment in which the AV is in operation. In one or more example embodiments or examples, the method 900 includes determining, at step 908, using the at least one processor, an action for the AV based on the intended action of the AV and the agent prediction. In one or more example embodiments or examples, the method 900 includes providing, at step 910, using the at least one processor, operation data associated with performance of the action to cause the AV to operate based on the action for the AV.

In one or more examples, the agent has and/or is capable of a dynamic behavior. The agent is, for example, one or more of: an actor (such as another vehicle) and road user. In one or more embodiments or examples, the sensor data is generated by at least one sensor of an autonomous vehicle operating in the environment. A perception system (such as perception system 402 of FIG. 4) can be configured to obtain the sensor data. In one or more example embodiments or examples, the intended action is associated with intended action data. The intended action data can be indicative of one or more of the following actions: a high-level intention of the AV, a lane change, a maneuver to park in spot, a maneuver to pull over, a maneuver to "go next" at a stop sign and any other suitable action. In one or more examples or embodiments, an intended action is any action (e.g., a dynamic action) that the AV is capable of taking within a specified timeframe. In one or more example embodiments or examples, the agent prediction is an AV estimated state indicative of the AV's estimation of the information the agent has about the intended action of the AV. In an example, the AV estimated state is a representation of the agent's high-level information about the intended action of the AV, such as a probabilistic "Hidden Knowledge State" (HKS). The HKS can denote what the AV thinks the agent knows about the intended action of the AV. The action for the AV is an action or operation to be performed by the AV. The action or operation to be performed by the AV can be one or more of: a signaling action, a slowing-down action, a speeding-up action, an action to activate flashing lights, an action to move forward, an action to yield way, an action to actively block way and any other suitable action. The action of the AV can be associated with action data.

In one or more example embodiments or examples, the method 900 includes obtaining, using the at least one processor, an agent profile. In one or more example embodiments or examples, the agent profile is one or more of: a passive profile and an aggressive profile.

In one or more example embodiments or examples, obtaining, using the at least one processor, the agent profile includes estimating, based on the sensor data, the agent profile. In other words, in one or more example embodiments or examples, the at least one processor utilizes sensor data to assess the agent profile.

In one or more example embodiments or examples, determining, at step 908, using the at least one processor, the action for the AV includes determining the action for the AV based on the intended action of the AV, the agent prediction and the agent profile. By considering the agent profile for the determination of the action for the AV, the action for the AV can be more accurately tailored to the environment in which the AV is in operation.

For example, the AV takes a specific action based on a determined or estimated agent profile in order to best react to an agent present in the environment.

In one or more example embodiments or examples, the method 900 includes predicting, using the at least one processor, based on the sensor data, an agent trajectory. In one or more example embodiments or examples, determining, at step 908, using the at least one processor, the action for the AV includes determining the action for the AV based on the intended action of the AV, the agent prediction and the predicted agent trajectory. By considering the predicted agent trajectory for the determination of the action for the AV, the action for the AV can be more accurately tailored to the environment in which the AV is in operation. For example, the AV takes a specific action based on a predicted agent trajectory in order to best react to an agent present in the environment.

In one or more example embodiments and examples, the method 900 includes obtaining, using the at least one processor, further sensor data associated with the environment after the action is performed by the AV. In one or more embodiments and examples, the method 900 includes updating, using the at least one processor, based on the further sensor data, the agent prediction. Therefore, the agent prediction can be updated according to the reaction of the agent to the performed action. In an example, the performed action for the AV includes choosing a trajectory with signaling actions, and the updated agent prediction includes an AV's estimation of the agent's knowledge about the subsequent intention of the AV, based on the agent's expected observation of the trajectory and the signaling actions of the AV. For example, the AV can perform the action of signaling a change of trajectory and the agent is determined to slow down in response to such signaling. The agent prediction is updated as the further sensor data captures the agent's response.

In one or more example embodiments or examples, the method 900 includes updating, using the at least one processor, based on the update of the agent prediction, the predicted agent trajectory. Accordingly, a subsequent determination of the action for the AV can be based on the updated agent prediction and the updated predicted agent trajectory.

In one or more example embodiments or examples, the method 900 includes predicting, using the at least one processor, a change in the agent prediction based on one or more of: the agent prediction, the action for the AV, the agent profile, and the predicted agent trajectory. In one or more example embodiments or examples, the method 900 includes determining, using the at least one processor, a utility score associated with the predicted change in the agent prediction based on one or more of: the agent prediction, the action for the AV, the agent profile, and the predicted agent trajectory. Put another way, the at least one processor can be provided with one or more of the following inputs: a current agent prediction, an action for the AV (such as a signaling action), an agent profile, and a predicted agent trajectory. The at least one processor can output an expected change in the agent prediction and a utility score associated with such change. The utility score can be indicative of how useful the change in the agent prediction is relative to a criterion that is selected for optimization.

In one or more example embodiments or examples, predicting the change in the agent prediction includes determining a transition function between a current state and a next state. In one or more example embodiments or examples, the current state is representative of one or more of: the agent prediction, the action for the AV, and the agent profile. The transition function is, for example, determined using one or more of: machine learning and neural network. In one or more example embodiments or examples, the operations include providing a game tree representative of an interaction between the AV and the agent, and exploring the game tree.

In one or more example embodiments or examples, the method 900 includes determining, using the at least one processor, based on the utility score, an AV trajectory. Since the utility score is representative of the utility of a change in the agent prediction, for example the utility of the agent prediction to determine an action for the AV, the utility score can be used to determine an AV trajectory corresponding to an action for the AV that is based on an agent prediction with a utility score higher than a utility threshold. This way, the utility score can be incorporated into a trajectory realizer's cost structure to allow for actions for the AV with high utility score. In other words, the utility score can be seen as a quantifier of desirable behavior, such as behavior of the agent that is favorable for the AV. An isolation of the modelled interaction can allow to discretize a search space into a classical tree structure.

In one or more example embodiments or examples, the environment includes a plurality of agents. In one or more example embodiments or examples, the method 900 includes filtering, using the at least one processor, based on a criterion, the agent among the plurality of agents. In one or more example embodiments or examples, the operations include filtering, based on a criterion, a subset of agents among the plurality of agents. In one or more example embodiments or examples, the criterion is based on one or more of: an agent position with respect to the AV, an agent constraining an intended AV trajectory, a difference between the intended action and the agent prediction and any other suitable criterion. The criterion can allow for a filtering of the agent or agents which are the most relevant for the AV, the circumstances of the AV and the intended action of the AV. Put another way, specific agents can be filtered out if deemed to be uninteresting according to heuristic or learned criteria, for example when expanding a tree modelling the interaction of the AV and the plurality of agents.

In one or more example embodiments or examples, determining, at step 904 and 906, using the at least one processor, the intended action and the agent prediction includes obtaining an AV internal state including the intended action and the agent prediction. The AV internal state can be seen as a state of the AV that can be used to determine an action for the AV. The AV internal state, in one or more example embodiments or examples, includes the agent profile in addition to the intended action of the AV and the agent prediction.

In one or more example embodiments or examples, the action for the AV includes one or more of: a signaling action, a velocity action, and a maneuver. The signaling action can be one or more of: an activation of a blinker, an activation of a turning light, an activation of a flashing light, and any other suitable signaling action. The velocity action can be one or more of: a slowing down action, a speeding up action, and any other suitable velocity action. The maneuver can be one or more of: a forward movement, a movement towards and edge of a lane, a yielding action, a blocking action, and any other suitable maneuver.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following items:

Item 1. A method comprising:

obtaining, using at least one processor, sensor data associated with an environment in which an autonomous vehicle (AV) is in operation; wherein the environment comprises an agent;

determining, using the at least one processor, an intended action of the AV based on the environment in which the AV is in operation;

determining, using the at least one processor, an agent prediction indicative of an action that the agent expects the AV to perform based on the environment in which the AV is in operation;

determining, using the at least one processor, an action for the AV based on the intended action of the AV and the agent prediction; and providing, using the at least one processor, operation data associated with performance of the action to cause the AV to operate based on the action for the AV.

Item 2. The method of item 1, the method further comprising:

obtaining, using the at least one processor, an agent profile.

Item 3. The method of item 2, wherein obtaining, using the at least one processor, the agent profile comprises:

estimating, based on the sensor data, the agent profile.

Item 4. The method of any of items 2 to 3, wherein determining, using the at least one processor, the action for the AV comprises:

determining the action based on the intended action of the AV, the agent prediction and the agent profile.

Item 5. The method of any of the previous items, the method further comprising: predicting, using the at least one processor, based on the sensor data, an agent trajectory;

wherein determining, using the at least one processor, the action for the AV comprises determining the action based on the intended action of the AV, the agent prediction and the predicted agent trajectory.

Item 6. The method of any of the previous items, the method further comprising:

obtaining, using the at least one processor, further sensor data associated with the environment after the action for the AV is performed by the AV; and updating, using the at least one processor, based on the further sensor data, the agent prediction.

Item 7. The method of items 5 and 6, the method comprising:

updating, using the at least one processor, based on the updated agent prediction, the predicted agent trajectory.

Item 8. The method of any of items 5 to 7, the method comprising:

predicting, using the at least one processor, a change in the agent prediction based on one or more of: the agent prediction, the action for the AV, the agent profile, and the predicted agent trajectory; and determining, using the at least one processor, a utility score associated with the predicted change in the agent prediction based on one or more of: the agent prediction, the action for the AV, the agent profile, and the predicted agent trajectory.

Item 9. The method of item 8, wherein predicting the change in the agent prediction comprises:

determining a transition function between a current state and a next state, wherein the current state is representative of one or more of: the agent prediction, the action for the AV, and the agent profile.

Item 10. The method of item 9, the method further comprising:

determining, using the at least one processor, based on the utility score, an AV trajectory.

Item 11. The method of any of the previous items, wherein the environment comprises a plurality of agents, the method further comprising:

filtering, using the at least one processor, based on a criterion, the agent among the plurality of agents, wherein the criterion is based on one or more of: an agent position with respect to the AV, an agent constraining an intended AV trajectory, and a difference between the intended action and the agent prediction.

Item 12. The method of any of the previous items, wherein determining, using the at least one processor, the intended action and the agent prediction comprises: obtaining an AV internal state comprising the intended action and the agent prediction.

Item 13. The method of any of the previous items wherein the action for the AV comprises one or more of: a signaling action, a velocity action, and a maneuver.

Item 14. A non-transitory computer readable medium comprising instructions stored thereon that, when executed by at least one processor, cause the at least one processor to carry out operations comprising:

obtaining sensor data associated with an environment in which an autonomous vehicle (AV) is in operation; wherein the environment comprises an agent;

determining an intended action of the AV based on the environment in which the AV is in operation;

determining an agent prediction indicative of an action that the agent expects the AV to perform based on the environment in which the AV is in operation;

determining an action for the AV based on the intended action of the AV and the agent prediction; and providing operation data associated with performance of the action to cause the AV to operate based on the action for the AV.

Item 15. The non-transitory computer readable medium of item 14, the operations further comprising:

obtaining an agent profile.

Item 16. The non-transitory computer readable medium of item 15, wherein obtaining the agent profile comprises:

estimating, based on the sensor data, the agent profile.

Item 17. The non-transitory computer readable medium of any of items 15 to 16, wherein determining the action for the AV comprises:

determining the action for the AV based on the intended action of the AV, the agent prediction and the agent profile.

Item 18. The non-transitory computer readable medium of any of items 14 to 17, the operations further comprising:

predicting, based on the sensor data, an agent trajectory;

wherein determining the action for the AV comprises determining the action based on the intended action of the AV, the agent prediction and the predicted agent trajectory.

Item 19. The non-transitory computer readable medium of any of items 14 to 18, the operations further comprising:

obtaining further sensor data associated with the environment after the action is performed by the AV; and updating, based on the further sensor data, the agent prediction.

Item 20. The non-transitory computer readable medium of items 18 and 19, the non-transitory computer readable medium comprising:

updating, based on the update of the agent prediction, the predicted agent trajectory.

Item 21. The non-transitory computer readable medium of items 18 to 20, the operations comprising:

predicting a change in the agent prediction based on one or more of: the agent prediction, the action for the AV, the agent profile, and the predicted agent trajectory; and determining a utility score associated with the predicted change in the agent prediction based on one or more of: the agent prediction, the action for the AV, the agent profile, and the predicted agent trajectory.

Item 22. The non-transitory computer readable medium of item 21, wherein predicting the change in the agent prediction comprises:

determining a transition function between a current state and a next state, wherein the current state is representative of one or more of: the agent prediction, the action for the AV, and the agent profile.

Item 23. The non-transitory computer readable medium of item 22, the non-transitory computer readable medium further comprising:

determining, based on the utility score, an AV trajectory.

Item 24. The non-transitory computer readable medium of any of items 14 to 23, wherein the environment comprises a plurality of agents, the operations further comprising:

filtering, based on a criterion, the agent among the plurality of agents, wherein the criterion is based on one or more of: an agent position with respect to the AV, an agent constraining an intended AV trajectory, and a difference between the intended action and the agent prediction.

Item 25. The non-transitory computer readable medium of any of items 14 to 24, wherein determining the intended action and the agent prediction comprises: obtaining an AV internal state comprising the intended action and the agent prediction.

Item 26. The non-transitory computer readable medium of any items 14 to 25, wherein the action comprises one or more of: a signaling action, a velocity action, and a maneuver.

Item 27. A system, comprising at least one processor, and at least one memory storing instructions thereon that, when executed by the at least one processor, cause the at least one processor to carry out operations comprising:

obtaining sensor data associated with an environment in which an autonomous vehicle (AV) is in operation; wherein the environment comprises an agent;

determining an intended action of the AV based on the environment in which the AV is in operation;

determining an agent prediction indicative of an action that the agent expects the AV to perform based on the environment in which the AV is in operation;

determining an action for the AV based on the intended action of the AV and the agent prediction; and providing operation data associated with performance of the action to cause the AV to operate based on the action for the AV.

Item 28. The system of item 27, the operations comprising:

obtaining an agent profile.

Item 29. The system of item 28, wherein obtaining the agent profile comprises:

estimating, based on the sensor data, the agent profile.

Item 30. The system of any of items 28 to 29, wherein determining the action for the AV comprises:

determining the action for the AV based on the intended action of the AV, the agent prediction and the agent profile.

Item 31. The system of any of items 27 to 30, the operations further comprising: predicting, based on the sensor data, an agent trajectory;

wherein determining the action for the AV comprises determining the action for the AV based on the intended action of the AV, the agent prediction and the predicted agent trajectory.

Item 32. The system of any of items 27 to 31, the operations further comprising: obtaining further sensor data associated with the environment after the action is performed by the AV; and updating, based on the further sensor data, the agent prediction.

Item 33. The system of items 31 and 32, the operations further comprising:

updating, based on the update of the agent prediction, the predicted agent trajectory.

Item 34. The system of items 31 to 33, the operations further comprising:

predicting a change in the agent prediction based on one or more of: the agent prediction, the action for the AV, the agent profile, and the predicted agent trajectory; and determining a utility score associated with the predicted change in the agent prediction based on one or more of: the agent prediction, the action for the AV, the agent profile, and the predicted agent trajectory.

Item 35. The system of item 34, wherein predicting the change in the agent prediction comprises:

determining a transition function between a current state and a next state, wherein the current state is representative of one or more of: the agent prediction, the action for the AV, and the agent profile.

Item 36. The system of item 35, the operations further comprising:

determining, based on the utility score, an AV trajectory.

Item 37. The system of any of items 27 to 36, wherein the environment comprises a plurality of agents, the operations further comprising:

filtering, based on a criterion, the agent among the plurality of agents, wherein the criterion is based on one or more of: an agent position with respect to the AV, an agent constraining an intended AV trajectory, and a difference between the intended action and the agent prediction.

Item 38. The system of any of items 27 to 37, wherein determining the intended action and the agent prediction comprises:

obtaining an AV internal state comprising the intended action and the agent prediction.

Item 39. The system of any items 27 to 38, wherein the action comprises one or more of: a signaling action, a velocity action, and a maneuver.

What is claimed is:

1. A method comprising:

obtaining, using at least one processor, sensor data associated with an environment in which an autonomous vehicle (AV) is in operation, wherein the environment comprises an agent;

determining, using the at least one processor, an intended action of the AV based on the environment in which the AV is in operation;

determining, using the at least one processor, an agent prediction indicative of an action that the agent expects the AV to perform based on the environment in which the AV is in operation;

determining, using the at least one processor, an action for the AV based on the intended action of the AV and the agent prediction; and providing, using the at least one processor, operation data associated with performance of the action to cause the AV to operate based on the action for the AV.

2. The method of claim 1, the method further comprising:

obtaining, using the at least one processor, an agent profile.

3. The method of claim 2, wherein obtaining, using the at least one processor, the agent profile comprises:

estimating, based on the sensor data, the agent profile.

4. The method of claim 2, wherein determining, using the at least one processor, the action for the AV comprises:

determining the action based on the intended action of the AV, the agent prediction and the agent profile.

5. The method of claim 2, the method further comprising:

predicting, using the at least one processor, based on the sensor data, an agent trajectory;

wherein determining, using the at least one processor, the action for the AV comprises determining the action based on the intended action of the AV, the agent prediction and the predicted agent trajectory.

6. The method of claim 5, the method further comprising:

obtaining, using the at least one processor, further sensor data associated with the environment after the action for the AV is performed by the AV; and updating, using the at least one processor, based on the further sensor data, the agent prediction.

7. The method of claim 5, the method comprising:

predicting, using the at least one processor, a change in the agent prediction based on one or more of: the agent prediction, the action for the AV, the agent profile, and the predicted agent trajectory; and determining, using the at least one processor, a utility score associated with the predicted change in the agent prediction based on one or more of: the agent prediction, the action for the AV, the agent profile, and the predicted agent trajectory.

8. The method of claim 7, wherein predicting the change in the agent prediction comprises:

determining a transition function between a current state and a next state, wherein the current state is representative of one or more of: the agent prediction, the action for the AV, and the agent profile.

9. The method of claim 8, the method further comprising:

determining, using the at least one processor, based on the utility score, an AV trajectory.

10. The method of claim 1, wherein the environment comprises a plurality of agents, the method further comprising:

filtering, using the at least one processor, based on a criterion, the agent among the plurality of agents, wherein the criterion is based on one or more of: an agent position with respect to the AV, an agent constraining an intended AV trajectory, and a difference between the intended action and the agent prediction.

11. The method of claim 1, wherein determining, using the at least one processor, the intended action and the agent prediction comprises:

obtaining an AV internal state comprising the intended action and the agent prediction.

12. The method of claim 1, wherein the action for the AV comprises one or more of: a signaling action, a velocity action, and a maneuver.

13. A system, comprising at least one processor, and at least one memory storing instructions thereon that, when executed by the at least one processor, cause the at least one processor to carry out operations comprising:

obtaining sensor data associated with an environment in which an autonomous vehicle (AV) is in operation; wherein the environment comprises an agent;

determining an intended action of the AV based on the environment in which the AV is in operation;

determining an agent prediction indicative of an action that the agent expects the AV to perform based on the environment in which the AV is in operation;

determining an action for the AV based on the intended action of the AV and the agent prediction; and providing operation data associated with performance of the action to cause the AV to operate based on the action for the AV.

14. The system of claim 13, the operations comprising:

obtaining an agent profile.

15. The system of claim 14, the operations further comprising:

predicting, based on the sensor data, an agent trajectory;

wherein determining the action for the AV comprises determining the action for the AV based on the intended action of the AV, the agent prediction and the predicted agent trajectory.

16. The system of claim 13, the operations further comprising:

obtaining further sensor data associated with the environment after the action is performed by the AV; and updating, based on the further sensor data, the agent prediction.

17. The system of claim 15, the operations further comprising:

updating, based on the update of the agent prediction, the predicted agent trajectory; and determining a utility score associated with a predicted change in the agent prediction based on one or more of: the agent prediction, the action for the AV, the agent profile, and the predicted agent trajectory.

18. A non-transitory computer readable medium comprising instructions stored thereon that, when executed by at least one processor, cause the at least one processor to carry out operations comprising:

obtaining sensor data associated with an environment in which an autonomous vehicle (AV) is in operation; wherein the environment comprises an agent;

determining an intended action of the AV based on the environment in which the AV is in operation;

determining an agent prediction indicative of an action that the agent expects the AV to perform based on the environment in which the AV is in operation;

determining an action for the AV based on the intended action of the AV and the agent prediction; and providing operation data associated with performance of the action to cause the AV to operate based on the action for the AV.

19. The method of claim 1, wherein determining an agent prediction comprises calculating a probabilistic prediction of what the agent knows about the intended action of the AV.

20. The method of claim 1, wherein the action is different than the intended action and wherein the agent is a vehicle, distinct from the AV.

* * * * *